United States Patent [19]

Hopper et al.

[11] Patent Number: 5,151,188

[45] Date of Patent: Sep. 29, 1992

[54] SUPERCRITICAL FLUID EXTRACTION ENHANCER

[75] Inventors: Marvin L. Hopper, Gladstone, Mo.; Jerry W. King, Peoria, Ill.

[73] Assignee: The Government of the United States of America, as represented by the Secretary of the Department of Health and Human Services, Washington, D.C.

[21] Appl. No.: 536,861

[22] Filed: Jun. 12, 1990

[51] Int. Cl.⁵ .................... B01D 11/00; B01D 15/08
[52] U.S. Cl. .................... 210/634; 210/635; 210/639; 210/908; 210/909; 203/49; 426/286; 426/425; 426/478; 426/665; 426/489; 554/193
[58] Field of Search ............ 210/634, 635, 639, 908, 210/909; 203/49; 426/286, 425, 478, 479, 489, 665; 260/412.8

[56] References Cited

U.S. PATENT DOCUMENTS

| | | | |
|---|---|---|---|
| 4,448,669 | 5/1984 | Scinta | 208/952 |
| 4,547,292 | 10/1985 | Zarchy | 210/634 |
| 4,584,140 | 4/1986 | Blewett et al. | 260/412.8 |
| 4,770,780 | 9/1988 | Moses | 210/634 |
| 4,816,159 | 3/1989 | Khosah et al. | 210/635 |
| 4,824,570 | 4/1989 | Bethual et al. | 210/511 |
| 4,877,530 | 10/1989 | Moses | 210/634 |
| 4,880,543 | 11/1989 | Khosah et al. | 210/635 |
| 4,898,673 | 2/1990 | Rice et al. | 210/634 |
| 4,976,979 | 12/1990 | Klima et al. | 426/427 |

FOREIGN PATENT DOCUMENTS

WO85/04816 11/1985 PCT Int'l Appl.
2032789 5/1980 United Kingdom ............ 203/49

OTHER PUBLICATIONS

Favati et al, "Supercritical Co Extraction of Carotene and Lutein from Leaf Protein Concentrates", *Journal of Food Science*, vol. 52, No. 5 (1988), pp. 1532–1536.

J. King, "Fundamentals and Applications of Supercritical Fluid Extraction in Chromatographic Science", *Journal of Chromatographic Science*, vol. 27 (Jul. 1989), pp. 355–364.

J. King et al, "Extraction of Fat Tissue from Heat Products with Supercritical Carbon Dioxide", *Agricultural & Food Chemistry* (Jul./Aug. 1989), pp. 951–954.

Ottenstein, "Column Support Materials for Use in Gas Chromatography", *Journal of Gas Chromatography*, vol. 1, No. 4 (Apr. 1963), pp. 11–23.

*Primary Examiner*—Stanley S. Silverman
*Assistant Examiner*—Thomas M. Lithgow
*Attorney, Agent, or Firm*—Lowe, Price, Leblanc & Becker

[57] ABSTRACT

A method for enhancing supercritical fluid extraction of sample matrices which contain water. The method involves mixing the samples with an extraction enhancing aid comprising flux-calcined diatomaceous earth which increases the permeability of the sample in a supercritical fluid and controls water during the extraction procedure.

16 Claims, 1 Drawing Sheet

SUPERCRITICAL FLUID EXTRACTION ENHANCER

TECHNICAL FIELD

The present invention relates to supercritical fluid extraction of soluble materials from sample matrices. More particularly, the present invention relates to a method of enhancing supercritical fluid extraction.

BACKGROUND ART

Supercritical fluids are finding wide acceptance in a number of analytical disciplines as unique solvation media. By far, the largest number of applications occur in the field of chromatography, where these dense gases are employed as extraction solvents and interactive mobile phases.

Historically, supercritical fluid chromatography has its origins in the mid-1960s, while its extraction analogue has only recently seen application in the field of analytical chemistry.

Supercritical fluid extraction is a technique whereby organic compounds can be extracted from sample matrices utilizing a dense carbon dioxide gas. The solvation power of carbon dioxide is increased as the pressure and temperature are increased above their critical points which are 1070 psi and 31° C. respectively.

U.S. Pat. Nos. 4,816,159 and 4,880,543 to Khosah et al disclose supercritical fluid chromatography methods which utilize specific packing materials. The packing materials disclosed in these patents are selected from metal oxide/hydroxide support materials having phosphorous-containing organic molecules bonded to reactive sites on the support materials.

U.S. Pat. Nos. 4,547,292 to Zarchy; 4,770,780 to Moses; 4,824,570 to Bethuel et al; 4,877,530 to Moses; and International Patent No. WO 85/04816 each disclose various processes or systems useful for practicing extraction utilizing supercritical fluids.

U.S. Pat. No. 4,898,673 to Rice et al discloses a dynamic supercritical fluid extraction system wherein solid samples are circulated in a mixture of carbon dioxide. This patent notes that liquid samples may be extracted in the dynamic system by absorbing the liquid samples on a solid carrier such as diatomaceous earth.

A number of articles authored or coauthored by one of the present inventors which discuss extraction methods that utilize supercritical fluids include the following:

Favati et al, "Supercritical $CO_2$ Extraction of Carotene and Lutein from Leaf Protein Concentrates", *J. Food Science*, Vol. 53, No. 5, pp. 1532-1536 (1988).

King, "Fundamentals and Applications of Supercritical Fluid Extraction in Chromatographic Science", *J. Chromatographic Science*, Vol. 27 pp. 355-364 (1989).

King et al, "Extraction of Fat Tissue from Meat Products with Supercritical Carbon Dioxide", *J. Agricultural & Food Chemistry*, Vol. 37, No. 4 pp. 951-954 (1989).

In the above, previous work by one of the present inventors it was found that lipids were completely soluble in supercritical carbon dioxide at 5 liter/min., 10,000 psi and 80° C. These conditions allowed a significant amount of lipids to be extracted from fatty foods in a reasonable time.

It was further discovered that water interferes with the supercritical carbon dioxide extraction of lipids from fatty foods. Complete extraction of lipids from moist fatty foods was achieved after drying the fatty foods over night in a forced air oven at 50° C. This technique worked well but was time consuming and had the potential for losing volatile components such as pesticides which may be contained in the lipids.

The present invention is an improvement over previous supercritical fluid extraction methods and provides for enhancement of extraction utilizing supercritical fluids.

DISCLOSURE OF THE INVENTION

It is accordingly one object of the present invention to provide a method of preparing a sample for supercritical fluid extraction.

Another object of the present invention is to provide a method increasing the permeability of a sample and controlling moisture in a sample so as to enhance extraction thereof by supercritical fluid extraction.

A further object of the present invention is to provide an improved method of supercritical fluid extraction.

A further object of the present invention is to provide an improved method of supercritical carbon dioxide extraction.

A still further object of the present invention is to provide an improved method of extracting volatile components from samples containing fats and moisture by supercritical extraction.

According to the present invention there is provided a method of preparing a sample for supercritical fluid extraction which comprises:

mixing a sample with an extraction enhancing aid which increases the permeability of the sample to a supercritical extraction solvent and which adsorbs water from the sample; and retaining the sample mixed with the extraction enhancing aid in an extraction column.

The present invention further provides for a supercritical extraction process which comprises:

mixing a sample with an extraction enhancing aid which increases the permeability of the sample to a supercritical extraction solvent and which adsorbs water from the sample;

retaining the sample mixed with the extraction enhancing aid in an extraction column; and passing a supercritical fluid through the sample and the extraction enhancing aid in the extraction column.

BRIEF DESCRIPTION OF DRAWINGS

The present invention will now be described with reference to the accompanying drawing which is given by way of a non-limiting example only, in which.

BEST MODE FOR CARRYING OUT THE INVENTION

Figure 1:
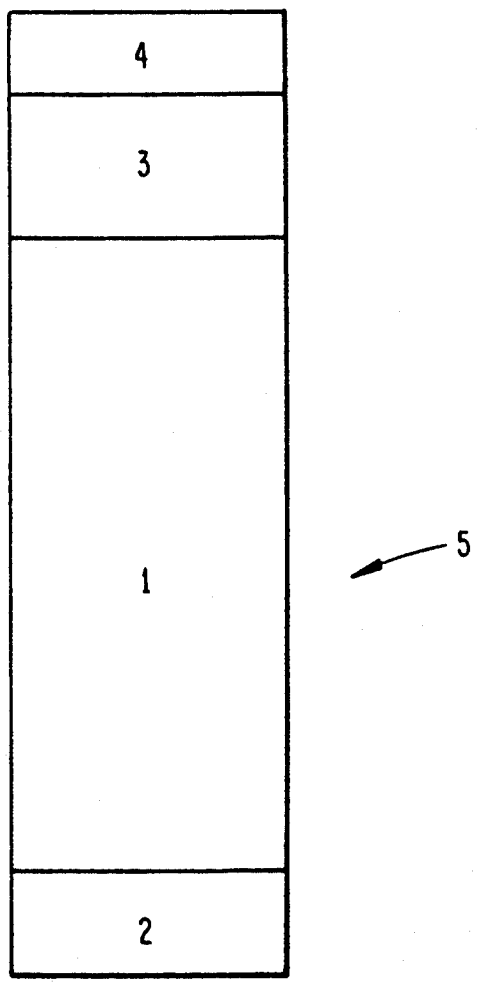
FIG. 1 is a schematic cross-sectional view of an extraction column loaded with a sample mixture according to the present invention.

The present invention relates to a method of preparing samples for extraction by supercritical fluids. According to the present invention, a sample is dispersed in an extraction enhancer which comprises a pelletized or granular diatomaceous earth to form a free flowing mixture which is loaded into an extraction column. Mixing the sample with the granular diatomaceous earth increases the permeability of the sample and helps control water which interferes with the supercritical fluid extraction.

Preparing the sample for supercritical fluid extraction by mixing it with granular diatomaceous earth has been discovered to eliminate problems caused by moisture in both fatty and nonfatty samples, such as foods.

The method of preparing a sample for supercritical fluid extraction involves mixing the sample in an appropriate amount of the extraction enhancer, i.e., diatomaceous earth, at ambient or room temperature to form a free-flowing mixture. The free-flowing mixture is created when excessive moisture in the sample is adsorbed into the porous extraction enhancer. In this regard, the extraction enhancer, i.e, diatomaceous earth, has the ability to adsorb twice its weight of water.

The free-flowing mixture of sample and extraction enhancer may be easily poured into an extraction column, thus creating a homogenous permeable extraction bed. This bed can then be efficiently extracted by supercritical carbon dioxide without channeling because the moisture from the sample combines on the large surface area of the extraction enhancer thus increasing the interaction between the sample and the supercritical carbon dioxide. This method of sample preparation minimizes the loss of volatile compounds and is quick and easy.

It has been discovered that samples which contain up to about 95 percent water to samples which are essentially pure lipophilic oil (containing essentially no water) can be efficiently extracted with supercritical carbon dioxide utilizing the sample preparation method of the present invention.

The supercritical extraction method of the present invention may be utilized in conjunction with any extraction column designed for use with high pressure, supercritical fluids. A particular system utilized by the present inventors is described in: Favati et al, "Supercritical $CO_2$ Extraction of Carotene and Lutein from Leaf Protein Concetrates", *J. Food Science*, Vol. 53,. No. 5, pp. 1532-1536 (1988); King, "Fundamentals and Applications of Supercritical Fluid Extraction in Chromatographic Science", *J. Chromatographic Science*, Vol. 27 pp. 355-364 (1989); and King et al, "Extraction of Fat Tissue from Meat Products with Supercritical Carbon Dioxide", *J. Agricultural & Food Chemistry*, Vol. 37, No. 4 pp. 951-954 (1989), each specifically incorporated by reference in regard to the extraction system.

The general procedure for practicing the method of the present invention will now be described with reference to FIG. 1. About 29 grams of sample is first weighed and placed in a suitable container such as a 500 ml beaker. About 13 grams of sieved, granular or pelletized diatomaceous earth (Chem Tube-Hydromatrix Material; Analytichem International, Habor City, Calif.) is added to the sample and mixed until the resulting mixture is homogeneous. A suitable sieve size is about 30 mesh. The mixture 1 is added to the extraction column 5 containing glass wool 2 in the bottom. The mixture may be settled in the extraction column 5 by tapping the extraction column on a solid surface such as a work bench.

An additional 11 grams of diatomaceous earth 3 is added to the top of the extraction column 5 and settled to help trap any water that may migrate during extraction. The additional diatomaceous earth added to the top of the extraction column may first be added to the original mixing container to wash out any remaining sample if desired.

Glass wool 4 is added to the top of the extraction column 5 to retain the sample mixture and the column is ready for supercritical carbon dioxide extraction.

In a general procedure utilized in the following examples, supercritical carbon extraction was conducted at 10,000 psi with the column heated in an extraction oven at a temperature of 80° C. The samples were extracted with 100 liters of carbon dioxide at 5 liters/min. The samples were collected at atmospheric pressure. The extraction column consisted of a 45.72 cm high pressure extraction column having a 2.54 cm o.d. and a 1.75 cm i.d.

The following examples are presented to illustrate features and characteristics of the present invention which is not meant to be considered as being limited thereto. In the examples and throughout, percentages are given by weight unless otherwise indicated.

EXAMPLE 1

In this example a sample of butter fat was fortified with organochlorine and organophosphate pesticides at two different levels. Separate portions of the fortified butter fat were mixed with either diatomaceous earth (Chem Tube-Hydromatrix Material; Analytichem International, Habor City, Calif.) or glass wool. Each mixture was loaded in a supercritical fluid extraction column and extracted with supercritical carbon dioxide at 10,000 psi and 80° C.

A known portion of the fortified butter fat, the fortified butter fat extracted from the glass wool, and the fortified butter fat extracted from 10 grams of the diatomaceous earth were analyzed for pesticide residues using existing methodology found in the Pesticide Analytical Manual (PAM) Vol. 1. The samples were cleaned up by gel permeation chromatography and mini-column Florisil before being analyzed for pesticide residues using gas chromatography.

The results of this example are presented in Tables I-V, below.

TABLE I

PESTICIDE RECOVERIES FROM BUTTER FAT

| | | Percent Recovered | | |
| | Spiking | | SFE Extracted From | |
| Pesticide | Level (ppm) | No Extraction | Glass wool | Hydromatrix Material |
| --- | --- | --- | --- | --- |
| Alpha BHC | 0.12 | 88 | 102 | 95 |
| Gamma BHC | 0.20 | 84 | 80 | 85 |
| Heptachlor | 0.20 | 92 | 92 | 85 |
| Chlorpyrifos | 0.60 | 86 | 88 | 87 |
| Heptachlor Epoxide | 0.40 | 85 | 96 | 82 |
| Cis Chlordane | 0.40 | 83 | 90 | 81 |
| Dieldrin | 0.60 | 87 | 93 | 84 |
| Endrin | 0.60 | 84 | 90 | 82 |
| HCB | 0.06 | 94 | 94 | 94 |
| p,p-Dicofol | 1.00 | 87 | 86 | 82 |
| Trans Chlordane | 0.20 | 87 | 91 | 84 |
| Trans Nonachlor | 0.20 | 84 | 92 | 91 |
| p,p-DDT | 0.60 | 92 | 89 | 91 |
| p,p-Methoxychlor | 2.00 | 107 | 99 | 98 |

TABLE II

PESTICIDE RECOVERIES FROM BUTTER FAT

| | | Percent Recovered | | |
| | Spiking | | SFE Extracted From | |
| Pesticide | Level (ppm) | No Extraction | Glass wool | Hydromatrix Material |
| --- | --- | --- | --- | --- |
| Alpha BHC | 0.012 | 114 | 111 | 93 |
| Gamma BHC | 0.020 | 102 | 106 | 81 |
| Heptachlor | 0.020 | 91 | 74 | 80 |

TABLE II-continued
PESTICIDE RECOVERIES FROM BUTTER FAT

| | | Percent Recovered | | |
| | Spiking | | SFE Extracted From | |
| Pesticide | Level (ppm) | No Extraction | Glass wool | Hydromatrix Material |
|---|---|---|---|---|
| Chlorpyrifos | 0.060 | 97 | 90 | 93 |
| Heptachlor Epoxide | 0.040 | 102 | 117 | 88 |
| Cis Chlordane | 0.040 | 88 | 101 | 85 |
| Dieldrin | 0.060 | 99 | 110 | 98 |
| Endrin | 0.060 | 90 | 88 | 85 |
| HCB | 0.006 | 124 | 100 | 100 |
| p,p-Dicofol | 0.100 | 91 | 92 | 114 |
| Trans Chlordane | 0.020 | 88 | 89 | 92 |
| Trans Nonachlor | 0.020 | 91 | 83 | 92 |
| p,p-DDT | 0.060 | 84 | 100 | 111 |
| p,p-Methoxychlor | 0.200 | 87 | 112 | 100 |

TABLE III
PESTICIDE RECOVERIES FROM BUTTER FAT

| | | Percent Recovered | | |
| | Spiking | | SFE Extracted From | |
| Pesticide | Level (ppm) | No Extraction | Glass wool | Hydromatrix Material |
|---|---|---|---|---|
| Penta Cl Benzene | 0.04 | 80 | 93 | 75 |
| Penta Cl Thio Anisole | 0.08 | 84 | 89 | 89 |
| Penta Cl Aniline | 0.10 | 96 | 100 | 91 |
| Penta Cl Anisole | 0.04 | 91 | 106 | 87 |
| Dicloran | 0.10 | 86 | 85 | 84 |
| Tecnazene | 0.06 | 90 | 88 | 86 |
| Quintozene | 0.08 | 90 | 93 | 85 |
| DCPA | 0.10 | 94 | 97 | 89 |
| Octachlor Epoxide | 0.20 | 95 | 103 | 93 |
| Endosulfan I | 0.20 | 92 | 100 | 90 |
| p,p-DDE | 0.30 | 90 | 95 | 95 |
| p,p-TDE | 0.40 | 92 | 116 | 100 |
| Endosulfan II | 0.40 | 91 | 111 | 96 |
| Endosulfan Sulfate | 0.40 | 96 | 107 | 102 |

TABLE IV
PESTICIDE RECOVERIES FROM BUTTER FAT

| | | Percent Recovered | | |
| | Spiking | | SFE Extracted From | |
| Pesticide | Level (ppm) | No Extraction | Glass wool | Hydromatrix Material |
|---|---|---|---|---|
| Penta Cl Benzene | 0.004 | 79 | 100 | 70 |
| Penta Cl Thio Anisole | 0.008 | 76 | 101 | 77 |
| Penta Cl Aniline | 0.010 | 90 | 95 | 95 |
| Penta Cl Anisole | 0.004 | 89 | 96 | 105 |
| Dicloran | 0.010 | 98 | 90 | 118 |
| Tecnazene | 0.006 | 80 | 82 | 89 |
| Quintozene | 0.008 | 80 | 116 | 92 |
| DCPA | 0.010 | 89 | 111 | 95 |
| Octachlor Epoxide | 0.020 | 108 | 117 | 103 |
| Endosulfan I | 0.020 | 86 | 97 | 92 |
| p,p-DDE | 0.030 | 108 | 104 | 98 |
| p,p-TDE | 0.040 | 92 | 102 | 92 |
| Endosulfan II | 0.040 | 89 | 74 | 91 |
| Endosulfan Sulfate | 0.040 | 94 | 98 | 98 |

TABLE V
PESTICIDE RECOVERIES FROM BUTTER FAT

| | | Percent Recovered | | |
| | Spiking | | SFE Extracted From | |
| Pesticide | Level (ppm) | No Extraction | Glass wool | Hydromatrix Material |
|---|---|---|---|---|
| Diazinon | 0.20 | 80 | 93 | 80 |
| Malathion | 0.60 | 88 | 100 | 77 |
| Methyl Parathion | 0.40 | 68 | 70 | 87 |
| Parathion | 0.40 | 78 | 73 | 87 |
| Methyl Chlorpyrifos | 0.40 | 78 | 84 | 94 |
| Chlorpyrifos | 0.40 | 99 | 99 | 97 |
| Lower spiking level | | | | |
| Diazinon | 0.02 | 80 | 75 | 71 |
| Malathion | 0.06 | 78 | 72 | 79 |
| Methyl Parathion | 0.04 | 73 | 73 | 98 |
| Parathion | 0.04 | 84 | 85 | 90 |
| Methyl Chlorpyrifos | 0.04 | 90 | 85 | 85 |
| Chlorpyrifos | 0.04 | 90 | 90 | 90 |

The results show that butter fat fortified with pesticides at two different levels can quantitatively be recovered with supercritical fluid extraction and analyzed by existing methodology. No pesticides were lost from the fortified butter fat during the supercritical fluid extraction as compared with the results obtained for the fortified butter fat which was not extracted.

EXAMPLE 2

In this example a sample of ground hamburger containing 41 weight percent moisture and 10.3 weight percent fat was analyzed for incurred pesticide residues using an organic solvent extraction (PAM Vol. 1) and supercritical fluid extraction. A supercritical fluid extraction was conducted utilizing 40 grams of the ground hamburger mixed with 10 grams diatomaceous earth (Chem Tube-Hydromatrix Material; Analytichem International, Habor City, Calif.) and 40 grams of the ground hamburger previously dried overnight in a 50° C. forced air oven. The dried hamburger and the hamburger mixed with the diatomaceous earth were loaded into extraction columns and extracted by a supercritical fluid extraction as in Example 1. The three extracts were analyzed for pesticides as in Example 1 above.

The results of this example are presented in Table VI below.

TABLE VI
ANALYSIS OF INCURRED PESTICIDES
(Hamburger)
(SFE Extracted from Dried Material and Hydromatrix material)

| | Original Analysis (ppm) | Incurred Pesticides in ppm | |
|---|---|---|---|
| Pesticide | | HYDROMATRIX | DRIED MATERIAL |
| p,p-DDE | 0.0005 | 0.0007 | 0.0010 |
| Methyl Chlorpyrifos | 0.0010 | 0.0005 | 0.0003 |
| Chlorpyrifos | 0.0008 | 0.0004 | 0.0003 |
| Malathion | 0.0050 | '0.0050 | 0.0028 |
| Diazinon | 0.0005 | 0.0005 | 0.0003 |

The results show that quantitative results can e achieved by utilizing either extraction step. The results further show that the supercritical fluid extraction of the sample mixed with the diatomaceous earth was equivalent to the supercritical fluid extraction of the dried sample. These results show that the sample mixed with the diatomaceous earth can be used in place of the time consuming drying step for fatty samples containing moisture.

EXAMPLE 3

In this example peanut butter containing 52.3 weight percent fat was analyzed for incurred pesticide residues using an organic solvent extraction (PAM Vol. 1) and supercritical fluid extraction. A supercritical fluid extraction was conducted utilizing 20 grams of the peanut butter mixed with 10 grams diatomaceous earth (Chem Tube-Hydromatrix Material; Analytichem International, Habor City, Calif.). The extracts were analyzed for pesticides as in the above examples.

The results of this example are presented in Table VII below.

TABLE VII
ANALYSIS OF INCURRED PESTICIDES
(Peanut Butter)
(SFE Extracted from Hydromatrix Material)

| Pesticide | Original Analysis (ppm) | Incurred Pesticides in ppm HYDROMATRIX MATERIAL |
|---|---|---|
| Penta Cl Benzene | 0.0008 | 0.0010 |
| HCB | 0.0004 | 0.0004 |
| Penta Cl Anisole | 0.0007 | 0.0001 |
| Quintozene | 0.0004 | None Found |
| Penta Cl Aniline | 0.0020 | 0.0021 |
| Penta Cl Thio Anisole | 0.0008 | 0.0002 |
| Heptachlor Epoxide | 0.0006 | 0.0004 |
| Dieldrin | 0.0030 | 0.0032 |
| Chlorpyrifos | 0.0070 | 0.0049 |
| p,p-DDE | 0.0020 | 0.0021 |
| Toxaphene | 0.1200 | 0.0800 |

The results show that equivalent results can be achieved for the analysis of peanut butter with either extraction technique. The results also show that a high fat sample with a low moisture content can be extracted with supercritical fluid extraction and diatomaceous earth.

EXAMPLE 4

In this example a ground potato sample containing 79.8 weight percent water and less than 0.1 gram fat/100g sample was fortified with 13 pesticides. 20 Grams of the fortified sample were mixed with 10 grams diatomaceous earth (Chem Tube-Hydromatrix Material; Analytichem International, Habor City, Calif.) and extracted with supercritical fluid extraction. The recoveries of the fortified pesticides in the potato sample are good and shown in Table VIII below.

TABLE VIII
PESTICIDE RECOVERIES FROM POTATOES
(SFE extracted from Hydromatrix material)

| Pesticide | Spiking Level (ppm) | Percent Recovered Hydromatrix Material |
|---|---|---|
| Alpha BHC | 0.024 | 90 |
| Gamma BHC | 0.040 | 82 |
| Heptachlor | 0.040 | 85 |
| Chlorpyrifos | 0.120 | 97 |
| Hepatchlor Epoxide | 0.080 | 95 |
| Cis Chlordane | 0.080 | 88 |
| Dieldrin | 0.120 | 98 |
| Endrin | 0.120 | 99 |
| Diazinon | 0.020 | 94 |
| Chlorpyrifos Methyl | 0.040 | 96 |
| Malathion | 0.060 | 84 |
| Ethion | 0.060 | 92 |
| Phosalone | 0.200 | 95 |

These results show that high moisture nonfatty samples can be easily extracted by supercritical fluid extraction without removing the water first. The diatomaceous earth was found to have adsorbed 15.96 ml of water. There was less than 0.2 grams of water in the final extract.

EXAMPLE 5

In this example Lettuce (95 weight percent water, less than 0.1 weight percent fat), boiled spinach (92 weight percent water, less than 0.3 weight percent fat), and carrots (88 weight percent water, less than 0.2 weight percent fat) were analyzed for incurred pesticide residues using an organic solvent extraction and a supercritical fluid extraction. Acetone was used in extracting 100 grams of each sample (Luke procedure, PAM Vol. 1). An aliquot of each sample extract was partitioned with methylene chloride, thus extracting compounds of interest. Solvent was evaporated to a low volume at which time hexane was added and re-evaporated to a low volume. The samples were then cleaned up on a mini-Florisil column and analyzed for pesticide residues by gas chromatography.

A supercritical fluid extraction was preformed on 20 grams of each sample after being mixed with 13 grams of diatomaceous earth (Chem Tube-Hydromatrix Material; Analytichem International, Habor City, Calif.). The supercritical fluid extract was dissolved in acetone and cleaned up as described above.

The incurred residue results obtained from the supercritical fluid extracted samples were comparable to the results obtained from the organic solvent extraction as shown in Tables IX–XI below.

TABLE IX
Analysis of Incurred Pesticide Residues
(Lettuce)

| Pesticide | Original Analysis (ppm) | SFE Extracted From Hydromatrix Material (ppm) |
|---|---|---|
| Methamidophos | 0.0009 | None Found |
| Acephate | 0.0040 | 0.0020 |
| Beta Mevinphos | 0.0050 | 0.0040 |
| Demeton-S-Sulfone | 0.0100 | 0.0080 |
| Disulfoton Sulfone | 0.0040 | 0.0030 |
| DCPA (Dacthal) | 0.0030 | 0.0050 |
| p,p-DDE | 0.0010 | 0.0050 |
| p,p-DDT | 0.0010 | 0.0030 |

TABLE X
Analysis of Incurred Pesticide Residues
(Boiled Spinach)

| Pesticide | Original Analysis (ppm) | SFE Extracted From Hydromatrix Material (ppm) |
|---|---|---|
| Chlorpyrifos | 0.0100 | 0.0070 |
| p,p-DDE | 0.0050 | 0.0040 |
| Dieldrin | 0.0006 | 0.0010 |
| p,p-DDT | 0.0020 | 0.0020 |
| DCPA (Dacthal) | 0.0020 | 0.0050 |
| Cis Permethrin | 0.4300 | 0.1300 |
| Trans Permethrin | 0.5400 | 0.1800 |

TABLE XI

Analysis of Incurred Pesticide Residues (Carrots)

| Pesticide | Original Analysis (ppm) | SFE Extracted From Hydromatrix Material (ppm) |
|---|---|---|
| Tecnazene | 0.060 | 0.060 |
| p,p-DDE | 0.070 | 0.031 |
| p,p-DDT | 0.060 | 0.028 |
| o,p-DDT | 0.020 | 0.016 |
| Linuron | 0.040 | 0.070 |

In all cases but one the residues found in the original analysis were found in the supercritical fluid extraction.

The above examples show that the diatomaceous earth is a viable extraction enhancer for supercritical carbon dioxide extraction and indicate that this extraction technique will prove to be advantageous in future applications. The extraction technique of the present invention are applicable to a large variety of samples, such as foods, biological tissues, fine particulate solids such as clays, and others materials.

Although the present invention has been described with reference to particular means, materials and embodiments, from the foregoing description, one skilled in the art can ascertain the essential characteristics of the present invention and various changes and modifications may be made to adapt the various uses and characteristics thereof without departing from the spirit and scope of the present invention as described in the claims which follow.

We claim:

1. A method of preparing a sample for supercritical fluid extraction which comprises:
   mixing a sample with an extraction enhancing aid which increases the permeability of the sample to a supercritical extraction solvent and which adsorbs water from the sample, said sample comprising a solid matrix and said extraction enhancing aid comprising flux-calcined diatomaceous earth; and
   retaining the sample mixed with the extraction enhancing aid in an extraction column.

2. A method of preparing a sample for supercritical fluid extraction according to claim 1, wherein said diatomaceous earth is in the form of pellets of granules.

3. A method of preparing a sample for supercritical fluid extraction according to claim 1, wherein said sample comprises a fatty sample.

4. A method of preparing a sample for supercritical fluid extraction according to claim 3, wherein said fatty sample comprises a moist fatty sample.

5. A method of preparing a sample for supercritical fluid extraction according to claim 4, wherein said sample comprises a food product.

6. A method of preparing a sample for supercritical fluid extraction according to claim 1, wherein said sample comprises a nonfatty sample.

7. A supercritical extraction process which comprises:
   mixing a sample with an extraction enhancing aid which increases the permeability of the sample to a supercritical extraction solvent and which adsorbs water from the sample, said sample comprising a solid matrix and said extraction enhancing aid comprising flux-calcined diatomaceous earth;
   retaining said sample mixed with said extraction enhancing aid in an extraction column; and
   passing a supercritical fluid through said sample and said extraction enhancing aid in said extraction column.

8. A supercritical extraction process according to claim 7, wherein said diatomaceous earth is in the form of pellets or granules.

9. A supercritical extraction process according to claim 7, wherein said sample comprises a fatty sample.

10. A supercritical extraction process according to claim 9, wherein said fatty sample comprises a moist fatty sample.

11. A supercritical extraction process according to claim 10, wherein said sample comprises a food product.

12. A supercritical extraction process according to claim 7, wherein said supercritical fluid comprises supercritical carbon dioxide.

13. A supercritical extraction process according to claim 12, wherein said supercritical carbon dioxide is passed through said sample and side extraction enhancing aid in said extraction column at a pressure of about 10,000 psi and a flow rate of about 5 liters per minute.

14. A supercritical extraction process according to claim 13, wherein said extraction column is heated to about 80° C. when said supercritical carbon dioxide is passed therethrough.

15. A supercritical extraction process according to claim 14, wherein extracted components are collected at atmospheric pressure.

16. A supercritical extraction process according to claim 7, wherein said sample comprises a nonfatty sample.

* * * * *